(12) United States Patent
Tveit et al.

(10) Patent No.: US 8,600,802 B1
(45) Date of Patent: Dec. 3, 2013

(54) ADVERTISEMENT MARKETPLACE

(75) Inventors: Amund Tveit, Trondheim (NO); Harald Tveit Alvestrand, Trondheim (NO); Sverre Sundsdal, Trondheim (NO)

(73) Assignee: Google Inc., Mountain View, CA (US)

( * ) Notice: Subject to any disclaimer, the term of this patent is extended or adjusted under 35 U.S.C. 154(b) by 1393 days.

(21) Appl. No.: 11/873,079

(22) Filed: Oct. 16, 2007

(51) Int. Cl.
G06Q 40/00 (2012.01)

(52) U.S. Cl.
USPC .......... 705/14.1; 705/26.1; 705/37; 705/36 R; 705/1.1

(58) Field of Classification Search
USPC .............. 705/1, 14, 1.1, 26.1, 37, 26.4, 36 R; 709/217, 219, 235; 715/787, 786, 771, 715/209
See application file for complete search history.

(56) References Cited

U.S. PATENT DOCUMENTS

| | | | |
|---|---|---|---|
| 5,724,521 A | | 3/1998 | Dedrick |
| 5,740,549 A | | 4/1998 | Reilly et al. |
| 5,848,397 A | * | 12/1998 | Marsh et al. ............... 705/14.61 |
| 5,948,061 A | * | 9/1999 | Merriman et al. ........... 709/219 |
| 6,026,368 A | | 2/2000 | Brown et al. |
| 6,044,376 A | | 3/2000 | Kurtzman, II |
| 6,078,914 A | | 6/2000 | Redfern |
| 6,144,944 A | * | 11/2000 | Kurtzman et al. ......... 705/14.54 |
| 6,167,382 A | | 12/2000 | Sparks et al. |
| 6,269,361 B1 | | 7/2001 | Davis et al. |
| 6,401,075 B1 | | 6/2002 | Mason et al. |
| 6,985,882 B1 | | 1/2006 | Del Sesto |
| 7,039,599 B2 | | 5/2006 | Merriman |
| 7,136,875 B2 | | 11/2006 | Anderson et al. |
| 2007/0157110 A1 | * | 7/2007 | Gandhi et al. ................. 715/779 |

FOREIGN PATENT DOCUMENTS

WO  WO 97/21183  6/1997

OTHER PUBLICATIONS

AdKnowledge Market Match Planner; Reviewer's Guide, AdKnowledge, May 1998.*
95/001,073, Reexamination of Stone et al., Sep. 30, 2004.
95/001,061, Reexamination of Stone et al., Sep. 3, 2002.
95/001,069, Reexamination of Dean et al., Jul. 11, 2002.
95/001,068, Reexamination of Stone et al., Dec. 7, 2002.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.

(Continued)

Primary Examiner — John H Holly
(74) Attorney, Agent, or Firm — Fish & Richardson P.C.

(57) ABSTRACT

A marketplace (or aftermarket) for advertisements or ad combinations is established. A first on-line advertisement is identified in which a performance of the first advertisement during a past ad campaign is above a threshold. A second on-line advertisement is identified based on a matching criterion between the first and second advertisements, in which a performance of the second advertisement during a past ad campaign is lower than the first advertisement. The first advertisement or a representation of the first advertisement and performance data of the first advertisement are provided to a sponsor of the second advertisement.

23 Claims, 7 Drawing Sheets

(56) References Cited

OTHER PUBLICATIONS

Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 Bl, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

* cited by examiner

FIG. 1

| Ad performance | Original ad | Example of customized advertisement for PipesRUs |
|---|---|---|
| *3% clickthrough rate, 4000 impressions per day* | Got your cellar filled during last thunderstorm in Maine? Let TubeDrainers fix it and get rid of your pain. [Keywords] — 128 | Got your cellar filled during last thunderstorm in Atlanta? Let PipesR'Us fix it and get rid of your pain. [Select this ad combo] — 142 [Edit this ad] — 144 [Edit keywords] — 146 |
| *2.5% clickthrough rate, 7000 impressions per day* | Leaking bathroom tubes? Don't worry, just call StopLeak Plumbers and we'll handle it within 2 business days. [Keywords] | Leaking bathroom tubes? Don't worry, just call PipesR'Us and we'll handle it within 2 business days. [Select this ad combo] [Edit this ad] [Edit keywords] |

ADVERTISEMENT MARKETPLACE

TECHNICAL FIELD

This document generally relates to information management.

BACKGROUND

On-line advertisements allow advertisers to reach a wide range of audiences through the Internet. The advertisements can be placed at specific areas of specific web pages. For example, a department store may place an advertisement on the home page of an on-line news web site. The advertisements can be associated with specific keywords and appear as sponsored links on search result web pages in response to user query having search terms that match the specific keywords associated with the advertisements. For example, when a user types the keyword "plumbing" into a search engine, the search results web page may include, in addition to the search results, a list of advertisements shown as sponsored links placed at an area of the search results page. The sponsored link may include a title, a short text description of the product or service being advertised, an URL of the advertiser, and a location of the advertiser. Some of the search results can also be advertisements. For example, the search results for the keyword "plumbing" may include web pages of plumbing services. Each search result may include a title, a snippet of the text in the web page, and an URL of the web page.

Advertisers benefit from the advertisements when users click on links associated with the advertisements or otherwise act on the advertisements to purchase products or services being advertised. Whether an advertisement performs well may depend on a number of factors, such as whether the advertisement appears near the top of a search results page so that the users can see the advertisement without having to scroll down several pages. The performance of an advertisement may depend on the quality of the advertisement, such as whether the text description of the advertisement is interesting and provides a positive impression to the user.

SUMMARY

This document describes a marketplace (or aftermarket) for advertisements or ad combinations. An ad combination refers to a combination of an advertisement and one or more other components, such as keywords or matching configuration associated with the advertisement. The matching configuration can include, for example, a landing web page. An infrastructure is provided for buying or selling advertisements or ad combinations after the advertisements or ad combinations have been used by advertisers in ad campaigns. Some measure of performance of the advertisements or ad combinations may be available. For example, the click-through rate or conversion rate of an advertisement or ad combination can be provided to allow potential buyers to evaluate the advertisement or ad combination before purchasing. The advertisements or ad combinations can be anonymized or generalized so that the buyer cannot identify the sponsors of the advertisements or ad combinations. The owners of the advertisements can be rewarded when their advertisements are purchased by others.

In general, in one aspect, a first on-line advertisement is identified in which a performance of the first advertisement during a past ad campaign is above a threshold; a second on-line advertisement is identified based on a matching criterion between the first and second advertisements, in which a performance of the second advertisement during a past ad campaign is lower than the first advertisement; and the first advertisement or a representation of the first advertisement and performance data of the first advertisement are provided to a sponsor of the second advertisement.

Implementations may include one or more of the following. A click-through rate or a conversion rate of the first advertisement can be identified to determine the performance of the first advertisement. Identifying the second on-line advertisement based on a matching criterion can include identifying the second advertisement based on a similarity between at least one of (a) one or more keywords associated with the first advertisement and one or more keywords associated with the second advertisement, or (b) text of the first advertisement and text of the second advertisement. Identifying the second advertisement can include identifying a second advertisement associated with a second geographical region not overlapping a first geographical region associated with the first advertisement.

A portion of the first advertisement can be modified to target a market for which the second advertisement targets. The first advertisement can be anonymized, and an anonymized advertisement can be provided to the sponsor of the second advertisement. Anonymizing the first advertisement can include removing portions of the first advertisement that can be used to identify a sponsor of the first advertisement. The first advertisement can be translated and the translated first advertisement can be provided to the sponsor of the second advertisement. A component associated with the first advertisement or a representation of the component associated with the first advertisement can be provided to the sponsor of the second advertisement, in which the component includes a keyword or a landing web page associated with the first advertisement. Identifying the second on-line advertisement can include comparing the first advertisement and a first component associated with the first advertisement with a second advertisement and a second component associated with the second advertisement, in which the first and second components include at least one of (a) one or more keywords associated with the corresponding advertisement, or (b) a landing web page for the corresponding advertisement.

In general, in another aspect, a user interface is provided to enable a user to search on-line advertisements; an input is received from the user indicating a selection of one of the advertisements; the selected advertisement is anonymized; and the anonymized advertisement and performance data associated with the advertisement are provided to the user, the performance data indicating a performance of the selected advertisement during a past ad campaign.

Implementations may include one or more of the following. A component associated with the advertisement or a representation of the component associated with the advertisement can be provided to the user, in which the component includes at least one of a keyword or a landing web page associated with the selected advertisement.

In general, in another aspect, an on-line advertisement marketplace is enabled, including displaying on-line advertisements or representations of the on-line advertisements and performance data of the on-line advertisements, and accepting instructions for purchasing one or more of the on-line advertisements.

Implementations may include one or more of the following. Displaying representations of the on-line advertisements can include displaying anonymized versions of the on-line advertisements. Customized versions of the on-line advertisements can be automatically generated by replacing locations or names in the on-line advertisements with the locations or names of potential buyers, and the customized versions of the on-line advertisements can be displayed. Keywords for the automatically generated customized versions of the on-line advertisements can be automatically determined.

In general, in another aspect, a storage device is provided to store advertisements and performance data indicating performance of the advertisements during past ad campaigns; and a matching engine is provided to match a second advertisement with a first advertisement and provide the first advertisement or a representation of the first advertisement, and the performance data associated with the first advertisement, to a sponsor of the second advertisement.

Implementations may include one or more of the following. The performance data can include at least one of a click-through rate and a conversion rate. The matching engine can identify the first advertisement by identifying an advertisement having a performance above a threshold. The matching engine can identify the second advertisement by identifying an advertisement having a performance below the threshold. The matching engine can match the second advertisement with the first advertisement based on a similarity between at least one of (a) one or more keywords associated with the first advertisement and one or more keywords associated with the second advertisement, or (b) text of the first advertisement and text of the second advertisement. An editing engine can be provided to modify the first advertisement to target a market for which the second advertisement targets. An anonymizing engine can be provided to modify the first advertisement to remove portions of the advertisement that can be used to identify a sponsor of the advertisement. A translation engine can be provided to translate the advertisement.

In general, in another aspect, a system includes means for identifying a first on-line advertisement in which a performance of the first advertisement during a past ad campaign is above a threshold; means for identifying a second on-line advertisement based on a matching criterion between the first and second advertisements, in which a performance of the second advertisement during a past ad campaign is lower than the first advertisement; and means for providing the first advertisement or a representation of the first advertisement and performance data of the first advertisement to a sponsor of the second advertisement.

These and other aspects and features, and combinations of them, may be expressed as methods, apparatus, systems, means for performing functions, program products, and in other ways.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
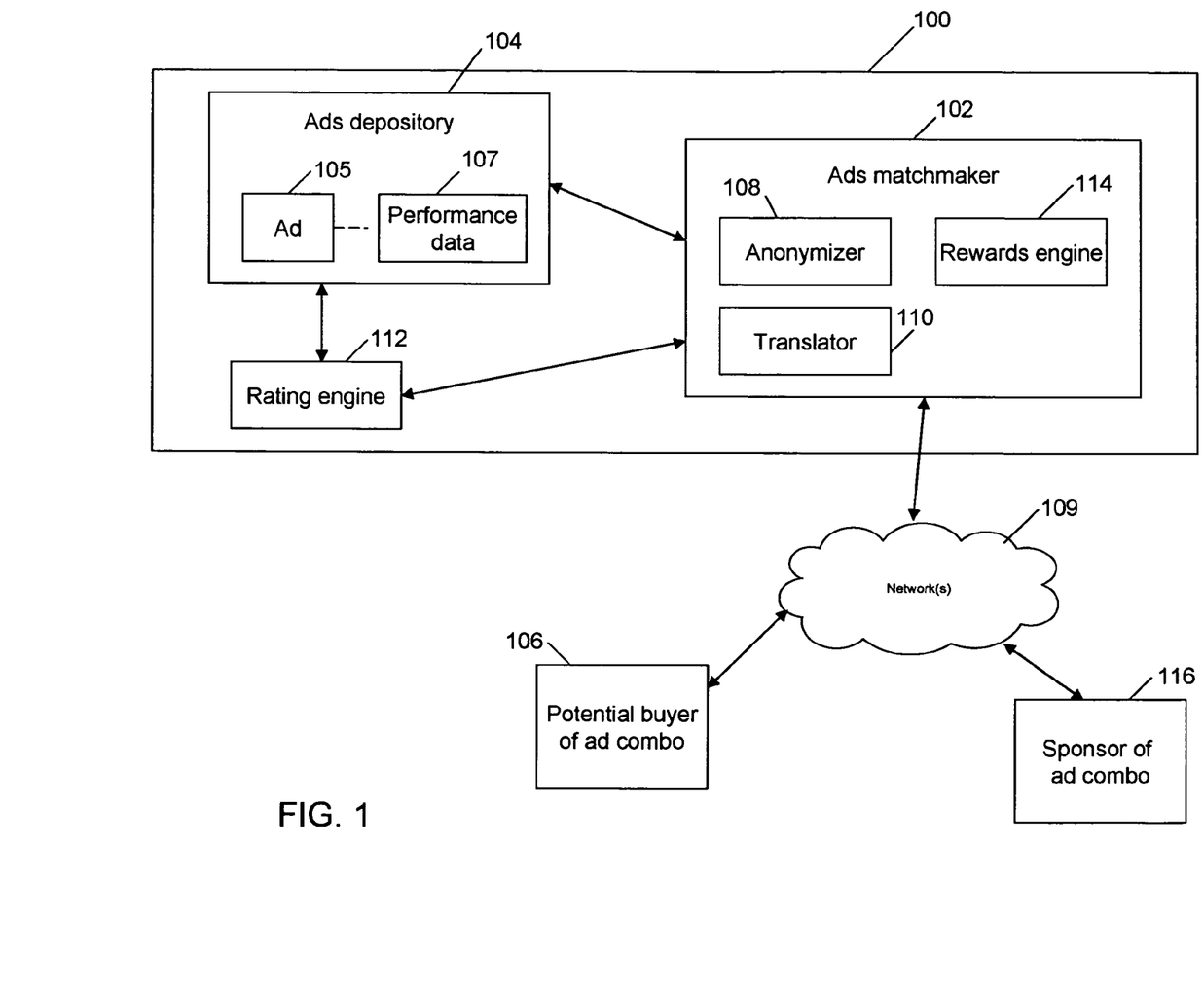
FIG. 1 is diagram of an example system that facilitates a marketplace for advertisements.

FIG. 1 is diagram of an example system 100 that facilitates a marketplace for advertisements (or ads). Though reference is made to supporting advertising, other forms of sponsored and non-sponsored content can be distributed by the system 100. An ads matchmaker 102 searches an ads depository 104 to find a high performing ad, and provides the high performing ad and associated performance data to a potential buyer 106. The performance data can include, e.g., a click-through rate or a conversion rate of the ad during past ad campaigns. Providing the performance data allows the potential buyer 106 to better evaluate whether to purchase the high performing ad. The ads can be, e.g., on-line or mobile textual ads.

The performance of an ad may be influenced by a combination of factors associated with the ad, such as keywords associated with the ad, location of the ad on the web property, content of the ad, and the landing page of the advertiser. The ad and one or more other factors associated with the ad will be referred to as an ad combination or "ad combo." The ads matchmaker 102 identifies a high performing ad combo from the ads depository 104 and provides the high performing ad combo and associated performance data to the potential buyer 106. A high performing ad can be one that exceeds a predetermined performance metric (e.g., historical click-throughs).

In the examples below, the system 100 processes high performing ad combos, but similar techniques can also be applied to the processing of high performing ads. While the examples describe processing of textual ads, similar techniques can be applied to ads having, e.g., images, video, and audio. Further, while the examples describe delivery of ads in a web environment, other delivery channels (e.g., radio, gaming, television, printed publication, etc.) are possible.

In some implementations, the ads matchmaker 102 allows potential buyers 106 to sign up as members of the ads marketplace. The ads matchmaker 102 can provide a graphical user interface (GUI) to show a list of predetermined products or services, such as plumbers, carpenters, electricians, gardeners, accountants, insurance brokers, real estate agents, dentists, web design consultants, etc. A potential buyer 106 can select one or more of the predetermined products or services. The ads matchmaker 102 searches the ads depository 104 to find high performing ad combos related to the selected products or services, and provides a list of high performing ad combos ranked by, e.g., similarity to the products or services selected by the buyer 106.

The ads matchmaker 102, the potential buyers 106, and the sponsor of ad combo 116 can be connected to each other by a network 109, such as a local area network (LAN), a wide area network (WAN), the Internet, any other type of network, or any combination of types of networks. In some implementations, one or more of the ads matchmaker 102, the ads depository 104, and the rating engine 112 may be integrated into a single server.

Figure 2:
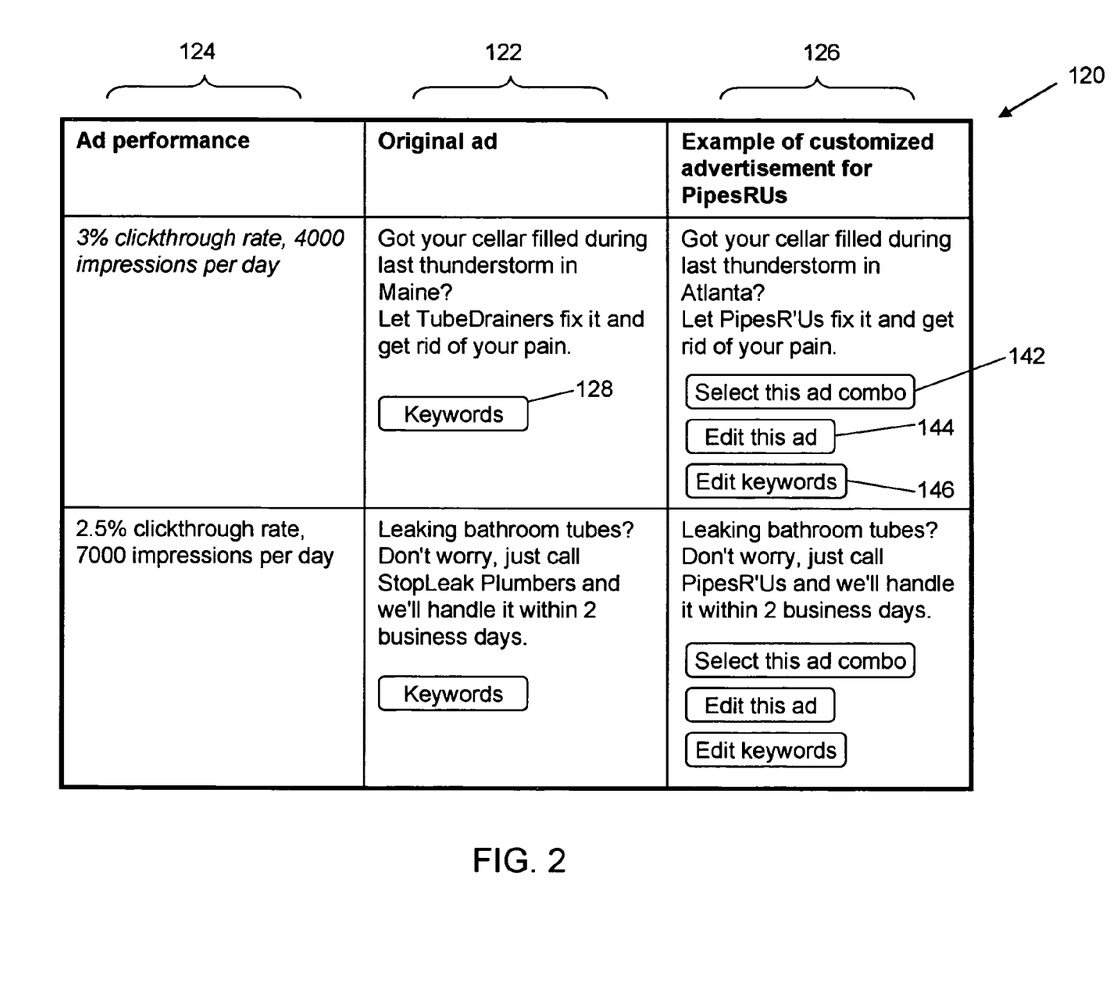
FIG. 2 is a diagram of an example graphical user interface.

Referring to FIG. 2, an example graphical user interface 120 shows original ad combos 122, the performance 124 of the original ad combos 122, and examples of customized ad combos 124 to potential buyers. In this example, the potential buyer is a company named "PipesRUs". In the customized ad combos 126, the company name "TubeDrainers" in the original ad combos 122 are replaced by the potential buyer company name "PipesRUs".

For example, the potential buyer can click on buttons 128 to look up keywords associated with the original ad combos 122. The potential buyer can click on buttons 142 to select particular ad combos, click on buttons 144 to edit the customized ad combos 126, and click on buttons 146 to edit the keywords associated with the customized ad combos 126.

In some examples, the ads matchmaker 102 identifies the potential buyer 106 by searching the ads depository 104 to identify owners of ad combos who may be interested in purchasing other ad combos. For example, the ads matchmaker 102 searches for a pair of high performing and low performing ad combos that are correlated to each other, e.g., related to similar products or services. A high performing ad combo related to a plumbing service may be matched with a low performing ad combo also related to a plumbing service. The sponsor (or owner) of the low performing ad combo is identified as a potential buyer 106.

In matching the high performing ad combo and the potential buyer 106, the ads matchmaker 102 may select a high performing ad combo that targets a geographical region different from that of the potential buyer. For example, a plumber who is marketing in the Chicago area has created high performing ad combos. The ad combo may be of interest to plumbers in other geographical locations, e.g., other parts of the United States, Canada, United Kingdom, Australia, and New Zealand. With translation (of keyword combinations and the ad text), the ad combo produced by the Chicago plumber may be of interest for plumbers worldwide. Selling or licensing the high performing ad combo to plumbers in areas outside of the Chicago area can provide additional revenue to the plumber marketing in the Chicago area while at the same time not affecting his plumbing business in the Chicago area.

After the ads matchmaker 102 identifies a potential buyer 106 (who is a sponsor of a lower performing ad combo), the ads matchmaker 102 may send a message to the potential buyer 106 to inquire whether the potential buyer 106 is interested in obtaining information about higher performing ads relevant to his or her ad combo. The message may include a link to a web page that provides the graphical user interface 120.

The ads matchmaker 102 may show, via the GUI 120, a list of higher performing ad combos ranked by, e.g., similarity to the ad combo sponsored by the potential buyer 106. In some implementations, the ads matchmaker 102 does not show the content of the ad combos (e.g., ad text, keywords, etc.) to the buyer 106 until the buyer 106 decides to buy the ad combo. For each ad combo to be offered to the buyer 106, the ads matchmaker 102 shows a general description of the ad combo and its performance data (e.g., click through rate, conversion rate, number of clicks, number of impressions, cost per click, and cost to view, etc.) The ads matchmaker 102 may require the buyer 106 to pay a fee for viewing the content of the ad combo, and a fee for purchasing the ad combo. The fees can be based on the past performance of the ad combo.

The ads matchmaker 102 may require the buyer 106 not to used the purchased ad combo to compete in the same market (e.g., geography) as the sponsor of the original ad combo.

The operator of the ads matchmaker 102 may also operate an ads network, in which ads are published on web sites of publishers that are members of the ads network. The buyer 106, after purchasing the higher performing ad combo and adding his or her product or service description to the ad combo, may allow the ad combo to be shown on web sites associated with the ads network. Both the buyer 106 and the operator of the ads network may receive revenue when the ad combo is displayed, clicked on, or acted on by other users.

For each high performing ad combo, the ads matchmaker 102 may offer one or more versions of the ad combo to the buyer 106, such as an unprocessed version, an anonymized version, or a generalized version. The anonymized and generalized versions are described below.

A feature of the system 100 is that the ads matchmaker 102 not only identifies ad combos that are potentially useful to the potential buyer 106, the ads matchmaker 102 also provides the potential buyer proof of the high performance of the high performing ad combo. For example, even though the plumber in New York can type the keywords "plumbers" or "plumbing service" in a search engine and find a listing of ads for plumbers or plumbing services, he will not know how well each ad has performed, and can only evaluate the ads based on their appearances, not by past performances. By contrast, the past performance data provided by the ads matchmaker 102 provides an indication of future performance. An ad combo that performed well in the past is more likely to perform well in the future.

The on-line environment favors high-performing ads. Web portals and search engines prefer to have fewer ads per page with higher click-through rates rather than having many ads per page with lower click-through rates. High performing ad combos can be difficult to produce. Small to medium enterprises may not have the expertise to produce good ad combos, and hiring professional ad agencies to produce the ad combos may be time consuming and expensive. Because small and medium enterprises and other advertisers may operate in accordance to certain constraints, e.g., constrained spatially, temporally, and/or language-wise, the ad combos can potentially be re-used outside the constrained market by similar advertisers in non-overlapping market segments. The system 100 enables the re-use of existing ad combos. The system 100 provides a convenient way for market entrants who do not already have ad combos to easily find relevant ad combos, and to allow advertisers who already have ad combos to find better performing ad combos.

The performance of an ad combo may be difficult to predict. An advertiser may design a new ad combo, test it on the market for a few weeks, and finding that the new ad combo does not perform very well. Thus, it may be more cost effective to run a re-used ad combo having a proven high performance track record. An advertiser can also run a high performance re-used, market-proven ad combo in parallel to a new, untested ad combo.

In some implementations, the ads matchmaker 102 anonymizes the high performing ad combo before providing it to the potential buyer 106. The anonymization may involve, e.g., removing information that can be used to identify the owner of the high performing ad combo. Examples of ad combo content that can be anonymized include business names and their corresponding abbreviations, person names, names of geographical locations, and various numerical properties (e.g., dates, prices, phone numbers, zip codes, and product properties). For example, an ad combo for a Chicago plumber may include the word "Chicago" and the URL of the plumber's company. After anonymization, the word "Chicago" and the plumber's URL may be removed. The anonymization process generates an ad combo template that includes blanks for which the identity or specific properties of the buyer 106 can be filled in.

Figure 3:
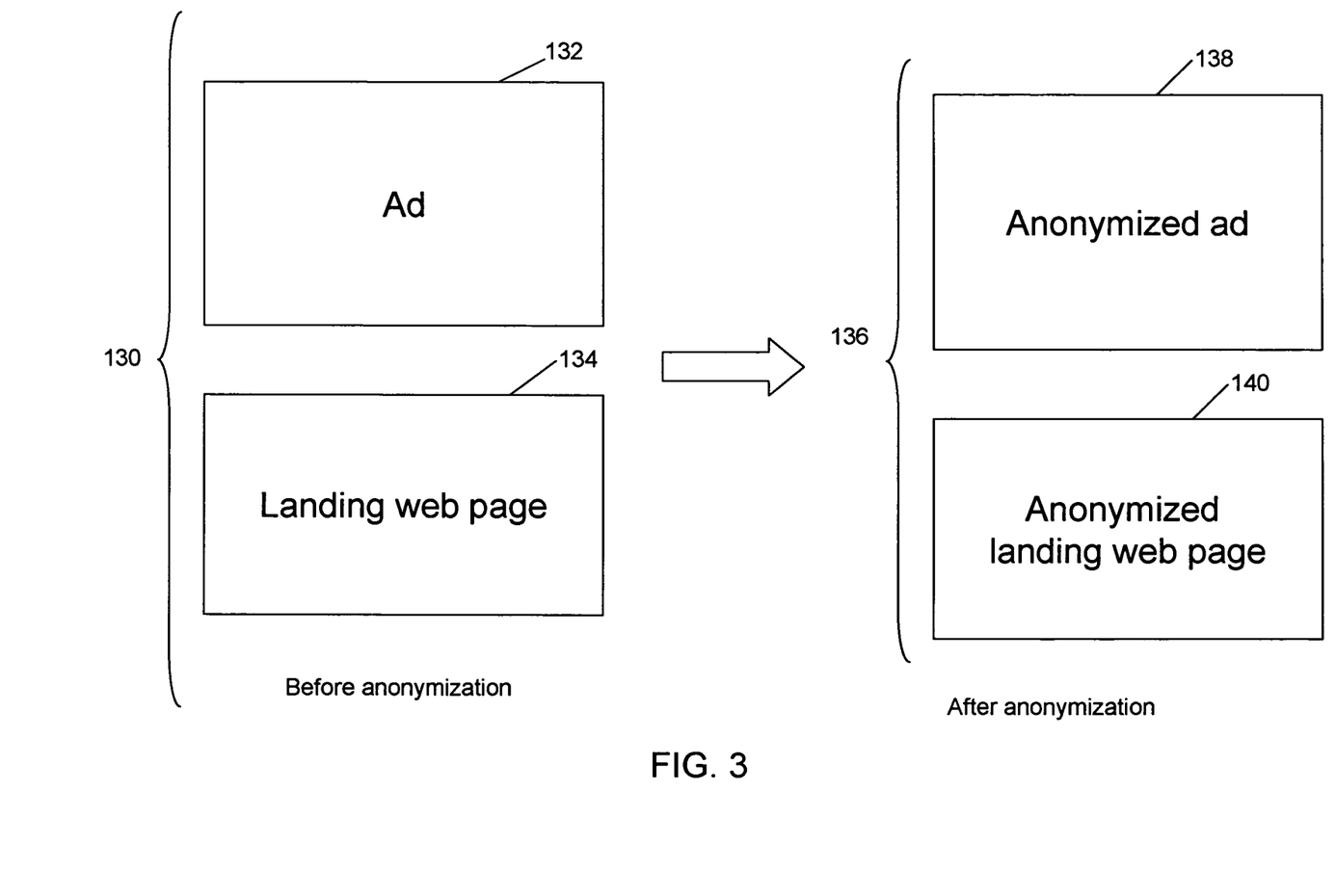
FIG. 3 is a diagram of an example an ad combo.

FIG. 3 shows an example of an ad combo 130 that includes an ad 132 and a landing web page 134. After anonymization, an anonymized ad combo 136 includes an anonymized ad 138 and an anonymized landing web page 140. The anonymized ad 138 and landing web page 140 can be used as templates, where blanks can be filled in with specific information about the product or service of the buyer 106.

Figure 4:
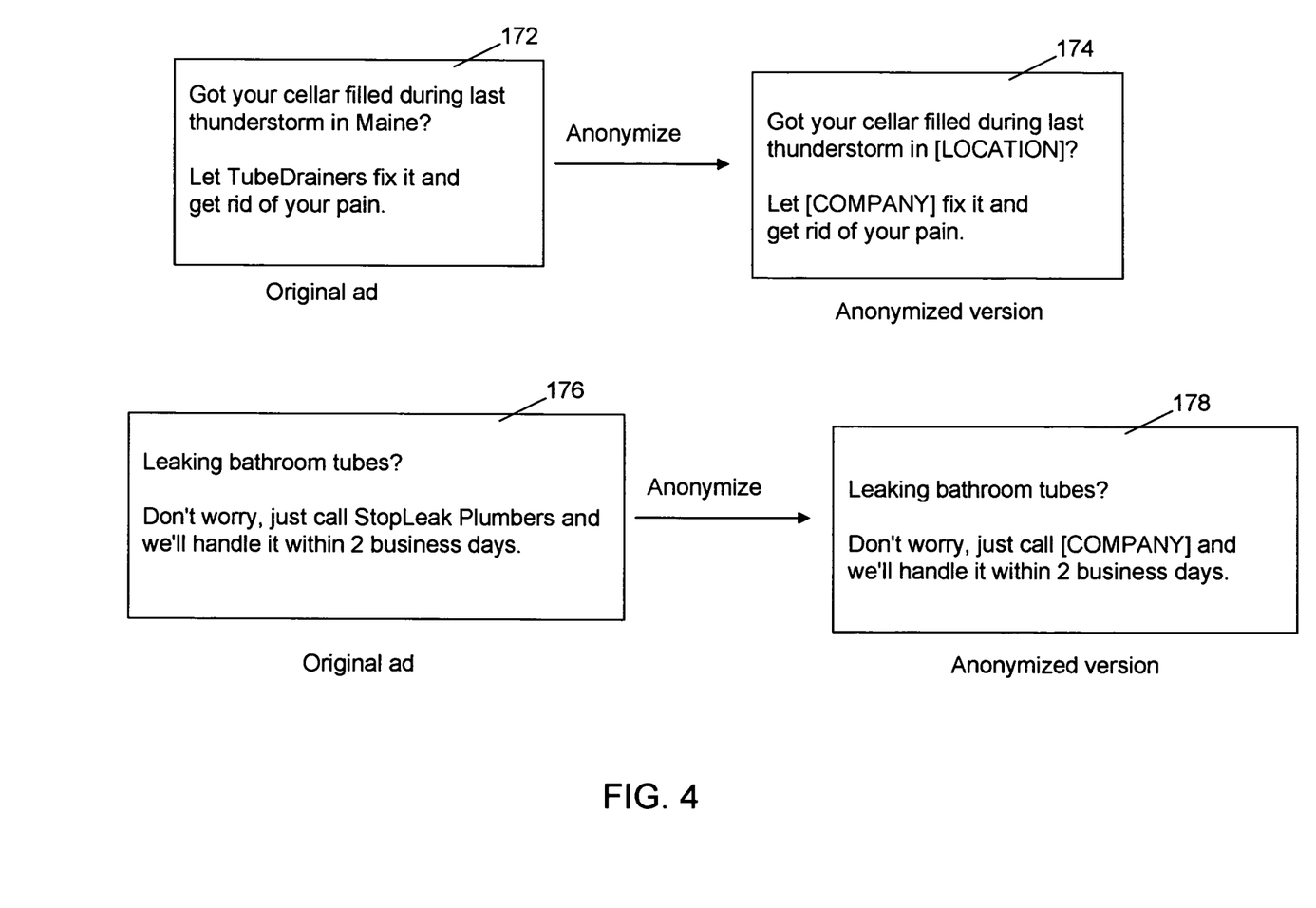
FIG. 4 is a diagram of examples of original ads and anonymized advertisements.

For example, referring to FIG. 4, an original ad combo 172 may include the message "Got your cellar filled during last thunderstorm in Maine? Let TubeDrainers fix it and get rid of your pain." After anonymization, the anonymized ad combo 174 may include the text "Got your cellar filled during last thunderstorm in [LOCATION]? Let [COMPANY] fix it and get rid of your pain." The placeholders [LOCATION] and [COMPANY] can be replaced by the new location and company name of the advertiser who purchased the ad combo.

As an example, an original ad combo 176 may include the message "Leaking bathroom tubes? Don't worry, just call StopLeak Plumbers and we'll handle it within 2 business days." After anonymization, the anonymized ad combo 178 may include the text "Leaking bathroom tubes? Don't worry, just call [COMPANY] and we'll handle it within 2 business days." The placeholder [COMPANY] can be replaced by the new company name of the advertiser who purchased the ad combo 144.

The anonymization can be extended to support aliases or common nicknames. For example, the term "big apple" (for New York) can be replaced with the [LOCATION] placeholder, and the term "big blue" (for IBM) can be replaced with the [COMPANY] place holder.

The ads matchmaker 102 includes an anonymizer 108 to anonymize the ad combos. A number of methods can be used to anonymize an ad combo. For example, dictionary based filtering can be used, in which dictionaries of allowed names are used to determine which terms to let through (i.e., not anonymize), and dictionaries of disallowed names are used to determine which terms should be filtered (i.e., anonymized). For example, verbs, nouns that are not names, adverbs, adjectives, do not need to be anonymized, whereas business names should be anonymized. Regular expressions can be used to find and filter out numerical or partially numerical expressions, such as dates, prices, zip codes, and various product properties.

Natural language processing with semantic and grammatical analysis can be used to identify nouns that may potentially be identifying information (i.e., information that identifies the owner of the ad combo) and thus should be anonymized.

Machine translation can be used find identifying information. For example, machine translation can be used to translate an ad combo between two or several languages, and words that are unchanged are filtered out. In some examples, machine translation does not change names and numerical entities, so the words that are not changed after machine translation are more likely to be names or numerical entities. This method can be used as a supplementary method in addition to the other methods. For example, a translation of the English phrase "Get a skilled plumber in Chicago" to Norwegian can be "Fa en dyktig rorlegger i Chicago", in which the word "Chicago" is not changed after the translation, so Chicago can be filtered out or be made into a variable for substitution in the ad combo template.

The system 100 includes a rating engine 112 that measures the performance of the ad combos. The performance of an ad combo can be measured based on, e.g., a click-through rate (as percentage of number of times displayed), an action-rate (the rate at which purchases occur after clicking on the ad), and a call rate (click-to-call rate, which measures the percentages of calls to salespersons that occur after clicking on the ad). Other metrics can also be used. For example, the total revenue for the advertiser (i.e., action-rate*price−advertising cost) and the number of impressions of the ad can also be used to evaluate the performance of the ad combo.

Grouping of high and low performing ad combos can be performed using a clustering method, in which certain metrics are used to compare two ad combos. For example, two ad combos can be grouped together if the number of common words between them is high. Ad combos can be grouped together based on keywords. For example, all the ad combos that have the keyword "plumber" can be grouped together.

In the implementation shown (though optional), the ads matchmaker 102 includes a machine translator 110 to translate the ad combos. For example, the potential buyer 106 may be located in a country that uses a language different from the one that the ad combo is written in. The machine translator 110 can use, e.g., statistical machine translation. The ads matchmaker 102 can include a spell checker to check for spelling errors in the translation. The machine translations may be manually edited to ensure quality of the ads.

In some implementations, the ads matchmaker 102 may identify words with possible spelling errors and provide suggestions of correct words. For example, words can be clustered using the Soundex algorithm so that words having similar pronunciation are grouped together. A word in the ad combo that is not in a dictionary is compared with a cluster of words that sound similarly, and if there is another word in the cluster that has a higher likelihood (e.g., as frequency of queries or web presence), the other word is suggested as the correct word.

Suggestion of correct words can also be based on word clusters that are formed according to edit distance. The edit distance between two strings of characters is the number of operations required to transform one of them into the other. Words that have slightly different spellings and have edit distances smaller than a threshold can be grouped together. For example, "googel", "google", and "googlle" can be grouped together. The word in the cluster that has a higher likelihood (e.g., as frequency of queries or web presence) is suggested as the correct word.

After an ad combo has been translated or anonymize, the ad combo can be "generalized" by comparing the translated or anonymized ad combo to the original ad combo to measure the distance between the two. For example, if an anonymized ad combo is very different from the original one, there is an indication that the anonymized ad combo can be used for other ad purposes (for example, other products or services). The anonymized ad comb is clustered with other ad combos to determine which ad purposes the anonymized version can be used for.

For example, an ad combo templates "[SOME PRODUCT OR SERVICE] keeps the doctor away" or "[SOME PRODUCT OR SERVICE] makes your day" can be used for various purposes. The placeholder [SOME PRODUCT, SERVICE] can be replaced with, e.g., "Exercise" or "Diet". In general, relatively generic (not product specific) ad texts can be used for several purposes.

The ads matchmaker 102 includes a rewards engine 114 to determine the amount of reward to be given to the sponsor of the high performing ad combo when the potential buyer 106 pays for viewing the content of the ad combo or purchases the ad combo. The reward can be in the form of a monetary payment, a discount on future ad spending (e.g., discount in fees for Google™ AdWords), or a discount on payment system use on the web or mobile web site of the sponsor (e.g., discount in fees for Google Checkout). The reward can be discounts on suppliers, producers of goods, parts that the original advertiser use or sell. The reward can be discounts on paid Google services or products (e.g., Google Search Appliance, Google Search Appliance Mini, or Google Apps).

The reward to the sponsor of the high performing ad combo can be an up-front payment based on the fees paid by the buyer 106, and an estimation of the ad combo performance and the future revenues that can be generated for the operator of the ads matchmaker. The ads matchmaker 102 may monitor the performance of the ad combo as used by the buyer 106, and reward the sponsor of the original ad combo based on the measured performance.

The ads matchmaker 102 may also provide the potential buyer 106 with the option of generating a new ad combo that has not been used before. The ads matchmaker 102 may request information from the buyer 106 about a product or service that is intended to be advertised, such as a landing page for the product or service. The text portion of an ad combo can be generated automatically by, e.g., automatic summarization of the product or service landing page. The ads matchmaker 102 can also search the database for two or more relevant ad combos based on the type of product or service, and use the two or more ad combos as input training to a natural language generation algorithm to automatically generate the text portion for a new ad combo. Suggestions of keywords for the new ad combo can be generated by clustering the text portion of the new ad combo with the text portions of existing ad combos, and use keywords from the closest existing ad combo as suggestions for keywords for the new automatically generated ad combo.

The ads are not limited to text ads, but can also include video or audio ads. For example, a high performing video ad combo can be processed using speech-to-text or automatic lip-reading analysis to generate the text corresponding to the vide or audio. The text is analyzed to identify portions that need to be anonymized. After anonymization, a video or audio ad template is generated. An anonymized ad combo that includes the video or audio ad template, and associated performance data, are provided to the potential buyer 106. The potential buyer 106 can purchase the anonymized ad combo, add information specific to the buyer 106 to the video or audio ad template, and use text-to-speech or text-to-animation of faces that speak to generate the audio or video ads for suitable use by the buyer 106.

The ad combos the methods described above can be used for other types of media, e.g., television, streaming video sent over networks, or radio.

Figure 5:
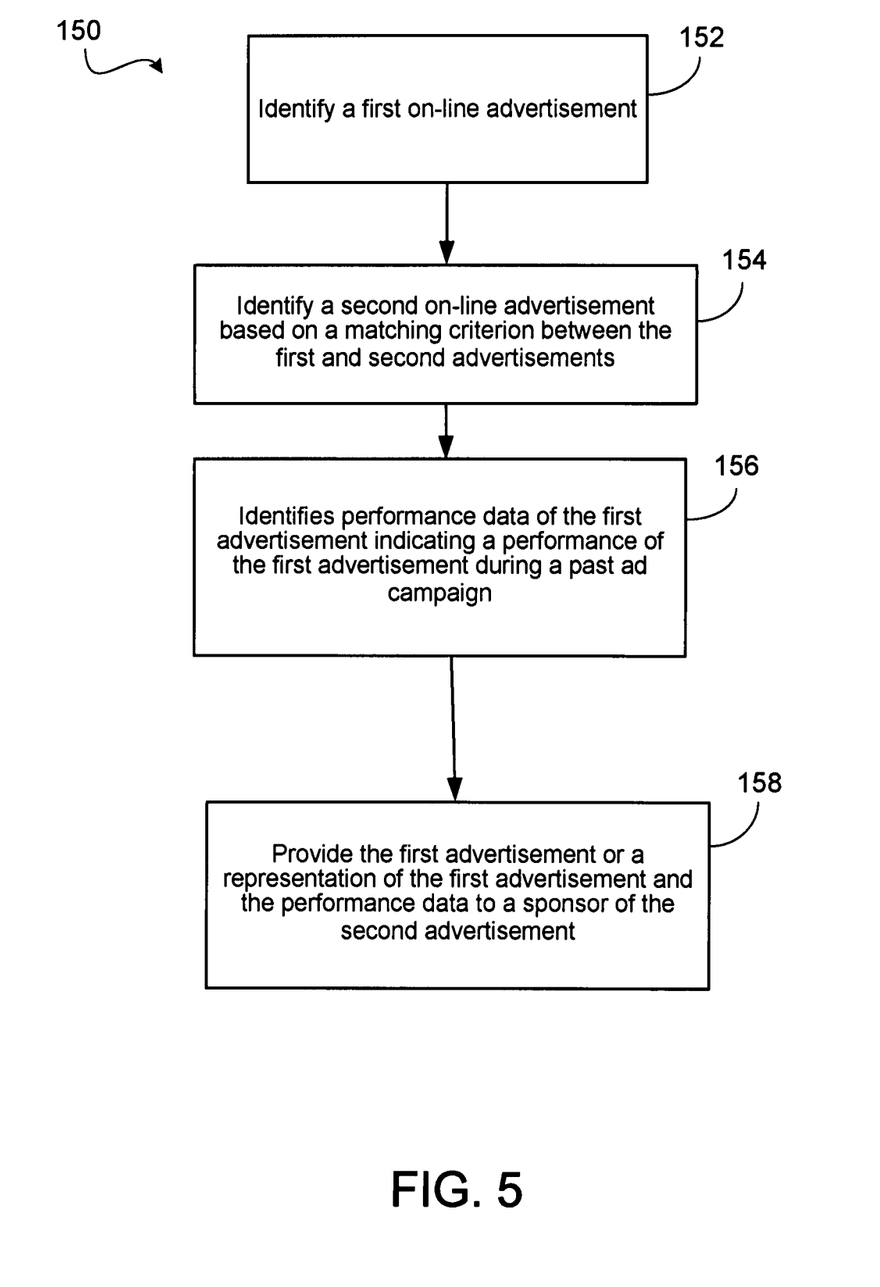
FIG. 5 is a flow diagram of an example process for identifying potential buyers of an advertisement.

FIG. 5 shows an example of a process 150 that can be used to identify a potential buyer of a high performing advertisement. The process 150 identifies a first on-line advertisement (152). The process 150 identifies a second on-line advertisement based on a matching criterion between the first and second advertisements (154). For example, the ads matchmaker 102 can be used to identify the first and second on-line advertisements that are stored in the ad depository 104.

The process 150 identifies performance data of the first advertisement indicating a performance of the first advertisement during a past ad campaign (156). For example, the performance data can be the performance data 107 in the ads depository 104 (FIG. 1). The process 150 provides the first advertisement or a representation of the first advertisement and the performance data to a sponsor of the second advertisement (158). For example, the sponsor can be the sponsor 116.

Figure 6:
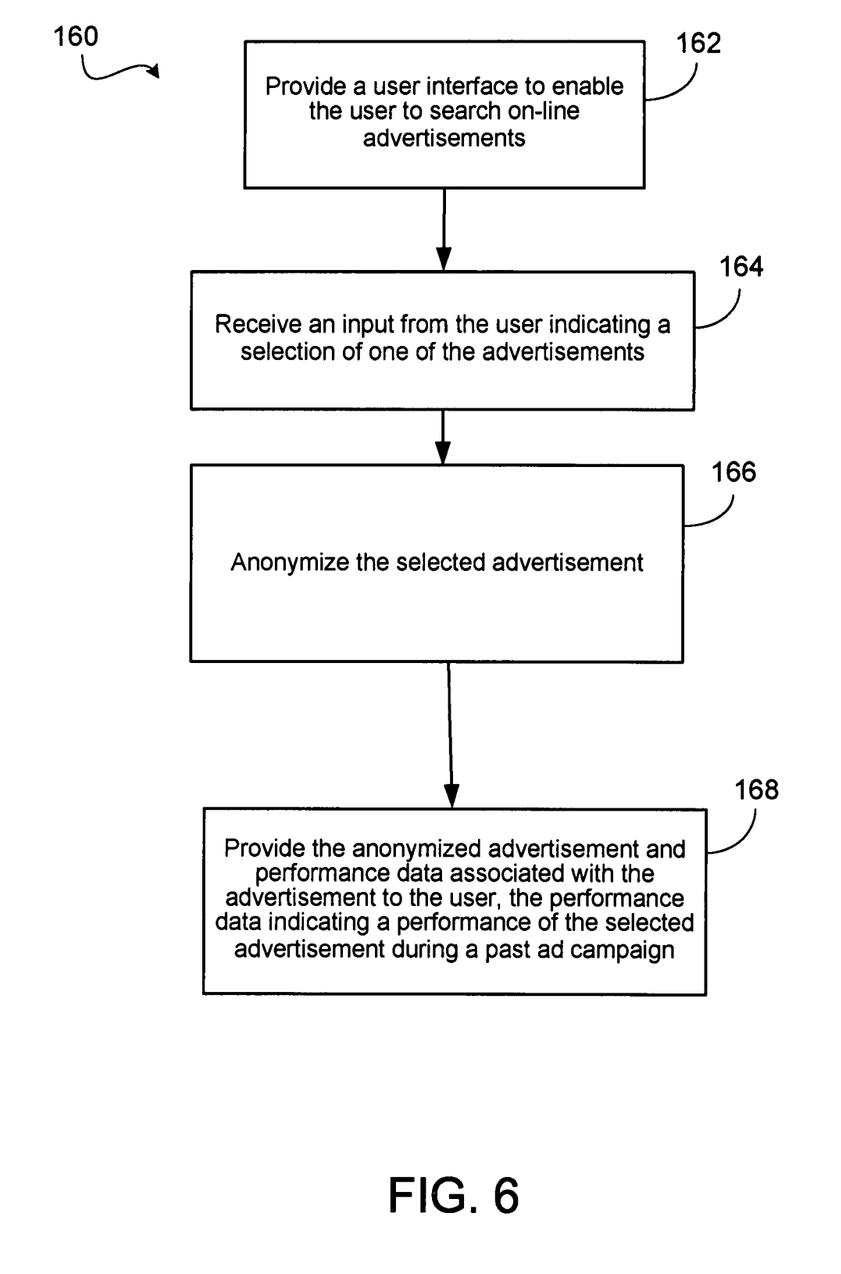
FIG. 6 is a flow diagram of an example process for identifying an advertisement.

FIG. 6 shows an example of a process 160 that can be used to identify a high performing ad for a user (e.g., a new advertiser). The process 160 provides a user interface to enable the user to search on-line advertisements (162). For example, the user interface can be the graphical user interface 120 of FIG. 2. The process 160 receives an input from the user indicating a selection of one of the advertisements (164). For example, the advertisements can be the advertisements 105 stored in the ads depository 104. The process 160 anonymizes the selected advertisement (166). For example, the anonymizing engine 108 can anonymize the selected advertisement. The process 160 provides the anonymized advertisement and performance data associated with the advertisement to the user, the performance data indicating a performance of the selected advertisement during a past ad campaign (168). For example, the performance data can be the performance data 107 stored in the ads depository 104.

Figure 7:
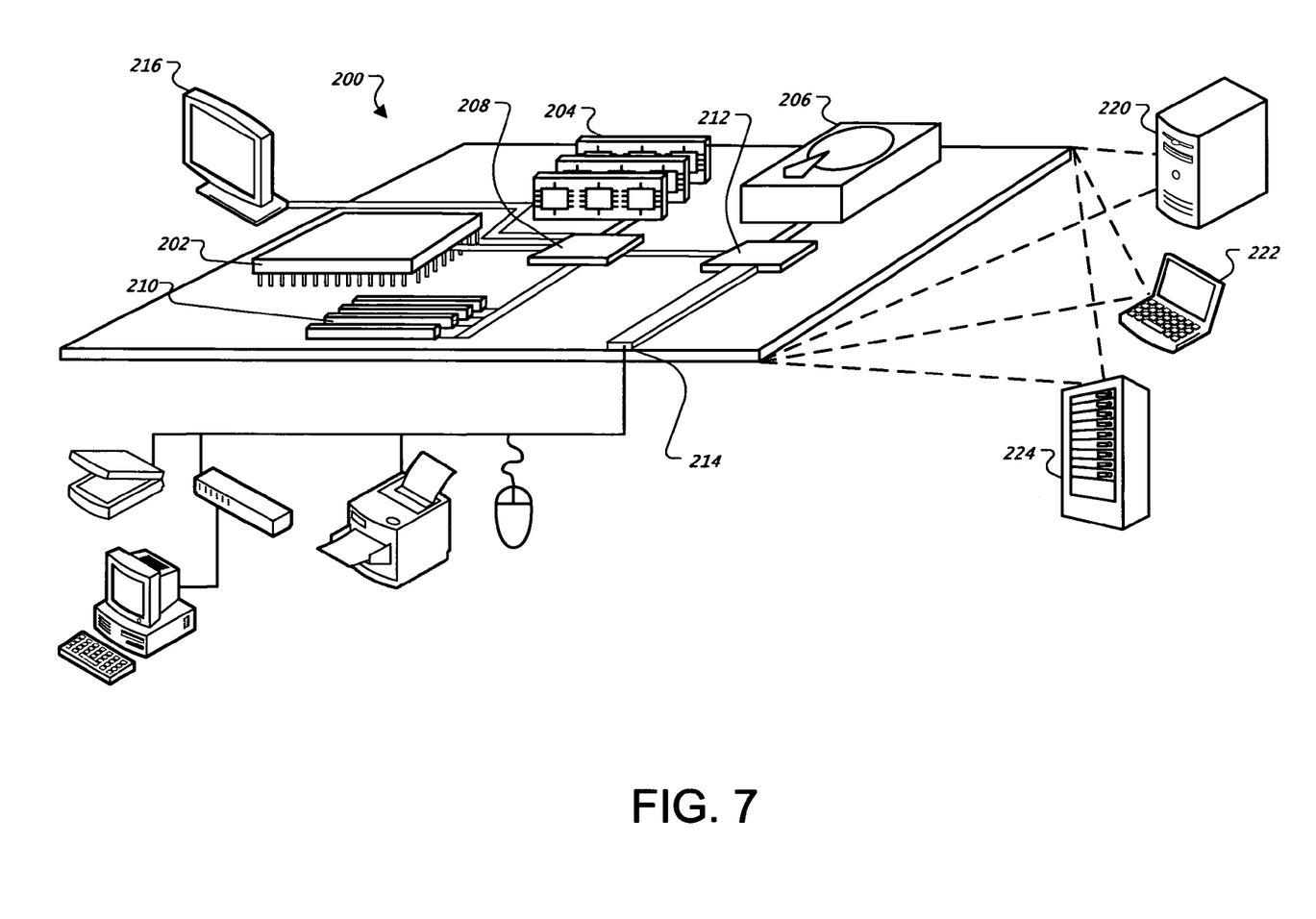
FIG. 7 shows a schematic representation of a general computing system.

FIG. 7 shows a schematic representation of a general computing system 200 that can be used to implement the system 100. Computing device 200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Each of such devices (e.g., standard server, rack server system, personal computer, laptop computer) may contain one or more of computing device 200, and an entire system may be made up of multiple computing devices 200 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

Different types of user interfaces can be used.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
identifying, by one or more processors, existing advertisements, using a matching criterion, in which a performance of each of the existing advertisements during a past ad campaign is above a threshold and each of the existing advertisements is associated with a corresponding participating advertisement sponsor;
identifying, by the one or more processors, a candidate advertisement, using the matching criterion, in which a performance of the candidate advertisement during a past ad campaign is lower than the performances of the existing advertisements during past ad campaigns of the corresponding participating advertisement sponsors, wherein the candidate advertisement is associated with a candidate advertisement sponsor different from each of the participating advertisement sponsors and the candidate advertisement is associated with a second geographical region not overlapping first geographical regions associated with the existing advertisements;
generating data usable to display available advertisements, based on the existing advertisements, and the corresponding performances of the existing advertisements to the candidate advertisement sponsor;
accepting instructions from the candidate advertisement sponsor for purchasing one of the available advertisements; and
providing the purchased advertisement or a representation of the purchased advertisement and performance data of the performance of the purchased advertisement to the candidate advertisement sponsor.

2. The method of claim 1, further comprising identifying click-through rates or conversion rates of the existing advertisements to determine the performances of the existing advertisements.

3. The method of claim 1 wherein identifying the candidate advertisement using the matching criterion comprises identifying the candidate advertisement based on a similarity between at least one of (a) one or more keywords associated with the existing advertisements and one or more keywords associated with the candidate advertisement, or (b) text of the existing advertisements and text of the candidate advertisement.

4. The method of claim 1, further comprising modifying a portion of the purchased advertisement to target a market for which the candidate advertisement sponsor targets.

5. The method of claim 1, wherein generating data usable to display available advertisements comprises anonymizing the existing advertisements and providing data usable to display the anonymized existing advertisements to the candidate advertisement sponsor.

6. The method of claim 5 wherein anonymizing the existing advertisements comprises removing portions of the existing advertisements that can be used to identify the corresponding participating advertisement sponsors.

7. The method of claim 1, further comprising translating at least one of the available advertisements and providing data usable to display the at least one translated available advertisement to the candidate advertisement sponsor.

8. The method of claim 1, further comprising providing a component associated with the purchased advertisement or a representation of the component associated with the purchased advertisement to the candidate advertisement sponsor, the component comprising a keyword or a landing web page associated with the purchased advertisement.

9. The method of claim 1 wherein identifying the candidate advertisement comprises comparing the existing advertisements and respective first components associated with the existing advertisements with the candidate advertisement and a second component associated with the candidate advertisement, the first and second components comprising at least one of (a) one or more keywords associated with the corresponding advertisement, or (b) a landing web page for the corresponding advertisement.

10. The method of claim 1, further comprising automatically generating customized versions of the existing advertisement by replacing locations or names in the existing advertisements associated with the corresponding participating advertisement sponsors with the locations or names associated with the candidate advertisement sponsor, and wherein:
generating data usable to display available advertisements comprises generating data usable to display the customized versions of the existing advertisements.

11. The method of claim 10, further comprising automatically determining keywords for the automatically generated customized versions of the existing advertisements.

12. The method of claim 1, further comprising:
charging a first fee to the candidate advertisement sponsor for providing the data to display the available advertisements to the candidate advertisement sponsor.

13. The method of claim 12, further comprising:
charging a second fee, separate from the first fee, to the candidate advertisement sponsor for purchasing the one of the available advertisements.

14. The method of claim 13, further comprising:
providing a reward to the corresponding participating advertisement sponsor of the purchased advertisement.

15. The method of claim 14, wherein the reward is a monetary payment to the corresponding participating advertisement sponsor of the purchased advertisement.

16. The method of claim 1, further comprising:
generating data usable to display a list of products and services to the candidate advertisement sponsor;
receiving a selection from the candidate advertisement provider of a product or service from the list of products and services; and
wherein identifying, by one or more processors, existing advertisements, using a matching criterion, comprises identifying the existing advertisements that are related to the selected product or service.

17. The method of claim 1, further comprising:
allowing the candidate advertisement sponsor to use the purchased advertisement in an ad campaign of the candidate advertisement sponsor.

18. A system comprising:
a data processing apparatus; and
software stored on a computer storage apparatus and comprising instructions executable by the data processing apparatus and upon such execution cause the data processing apparatus to perform operations comprising:
identifying existing advertisements, using a matching criterion, in which a performance of each of the existing advertisements during a past ad campaign is above a threshold and each of the existing advertisements is associated with a corresponding participating advertisement sponsor;
identifying a candidate advertisement, using the matching criterion, in which a performance of the candidate advertisement during a past ad campaign is lower than the performances of the existing advertisements during past ad campaigns of the corresponding participating advertisement sponsors, wherein the candidate advertisement is associated with a candidate advertisement sponsor different from each of the participating advertisement sponsors and the candidate advertisement is associated with a second geographical region not overlapping first geographical regions associated with the existing advertisements;
generating data usable to display available advertisements, based on the existing advertisements, and the corresponding performances of the existing advertisements to the candidate advertisement sponsor;
accepting instructions from the candidate advertisement sponsor for purchasing one of the available advertisements; and
providing the purchased advertisement or a representation of the purchased advertisement and performance data of the performance of the purchased advertisement to the candidate advertisement sponsor.

19. The system of claim 18 wherein the performance data comprises at least one of a click-through rate and a conversion rate.

20. The system of claim 18 wherein identifying a candidate advertisement comprises identifying the candidate advertisement based on a similarity between at least one of (a) one or more keywords associated with the existing advertisements and one or more keywords associated with the candidate advertisement, or (b) text of the existing advertisements and text of the candidate advertisement.

21. The system of claim 18, wherein upon execution of the instructions the data processing apparatus further performs operations comprising modifying the purchased advertisement to target a market for which the candidate advertisement targets.

22. The system of claim 18, wherein upon execution of the instructions the data processing apparatus further performs operations comprising anonymizing the existing advertisements to remove portions of the existing advertisements that can be used to identify the corresponding participating advertisement sponsors.

23. The system of claim 18, wherein upon execution of the instructions the data processing apparatus further performs operations comprising translating at least one of the available advertisements.

\* \* \* \* \*

UNITED STATES PATENT AND TRADEMARK OFFICE
CERTIFICATE OF CORRECTION

PATENT NO. : 8,600,802 B1  
APPLICATION NO. : 11/873079  
DATED : December 3, 2013  
INVENTOR(S) : Amund Tveit, Harald Tveit Alvestrand and Sverre Sundsdal It is certified that error appears in the above-identified patent and that said Letters Patent is hereby corrected as shown below:

On Title Page 2, Column 2 Item (56) (Other Publications), line 5, delete "Bl," and insert -- B1, --, therefor.

Signed and Sealed this  
Eighth Day of April, 2014

Michelle K. Lee  
*Deputy Director of the United States Patent and Trademark Office*